United States Patent [19]
Michael

[11] Patent Number: 6,041,873
[45] Date of Patent: Mar. 28, 2000

[54] NON-CRYOGENIC NITROGEN FOR ON-SITE DOWNHOLE DRILLING AND POST DRILLING OPERATIONS

[75] Inventor: Keith Michael, Spring, Tex.

[73] Assignee: MG Nitrogen Services, Inc., Malvern, Pa.

[*] Notice: This patent is subject to a terminal disclaimer.

[21] Appl. No.: 09/173,285

[22] Filed: Oct. 15, 1998

Related U.S. Application Data

[63] Continuation of application No. 08/944,919, Oct. 6, 1997, Pat. No. 5,862,869, which is a continuation of application No. 08/707,352, Sep. 4, 1996, Pat. No. 5,749,422, which is a continuation-in-part of application No. 08/077,014, Jun. 14, 1993, Pat. No. 5,388,650.

[51] Int. Cl.[7] .................................................. E21B 21/00
[52] U.S. Cl. ................................................................ 175/71
[58] Field of Search ................................. 175/71; 95/47, 95/138

[56] References Cited

U.S. PATENT DOCUMENTS

| | | |
|---|---|---|
| 2,786,652 | 3/1957 | Wells . |
| 3,286,778 | 11/1966 | Jackson . |
| 4,136,747 | 1/1979 | Mallory et al. . |
| 4,161,222 | 7/1979 | Pye . |
| 4,463,814 | 8/1984 | Horstmeyer et al. . |
| 4,871,378 | 10/1989 | Pinnau . |
| 5,207,806 | 5/1993 | Lagree et al. . |
| 5,215,151 | 6/1993 | Smith et al. . |
| 5,862,869 | 1/1999 | Michael ................................... 175/71 |

FOREIGN PATENT DOCUMENTS

| | | |
|---|---|---|
| 0 451 677 A2 | 10/1991 | European Pat. Off. . |
| 2 186 682 | 8/1987 | United Kingdom . |

OTHER PUBLICATIONS

"Amoco Plans Test of Nitrogen Injection for Coalbed Methane"; Oil & Gas Journal, Oct. 28, 1991; pp. 30.

"Stewart & Stevenson Petroleum Products"; 1991–1992 Catalog; pp. 10, 11 and 32–35.

"Membrane Separation Offers Low–cost Inert Gas Safety"; Ocean Industry, Jul. 1990; pp. 27–29.

"Liquid Nitrogen Developments and Applications in Drilling and Completion Operations"; Journal of Canadian Petroleum; Winter 1964–65, Montreal; pp. 158–164.

"Chementator"; Chemical Engineering; Jun. 29, 1981; p. 18.

"Use of An Inert Drilling Fluid to Control Geothermal Drill Pipe Corrosion"; Corrosion/81; Paper No. 224 (Apr. 6–10, 1981)(6 pages).

New Release; Dateline: Houston, TX; Apr. 17, 1991; "Stewart & Stevenson and Generon Systems Introduce High Tech Nitrogen Pumper".

News Release: Skid Mounted Nitrogen Unit Developed May, 1991, Pennwell Publishing Co. (One Page).

"Development of the Cotton Valley Geopressure Zone in Panola County, Texas, Using Air/$N^2$ Drilling and Openhole Completion Techniques"; Society of Petroleum Engineers; SPE 14657, (1986)(12 pages).

"Out of Thin Air"; Chemical Engineering; Jun. 1991, beginning on p. 30 (7 pages).

"Drilling With Air, Field Experience and Investigations Shed More Light on Down–Hole Explosions"; The Petroleum Engineer; Jan. 1956; pp. B–21–B24.

Power News; vol. 31, No. 1; Spring, 1991; pp. 1–4.

(List continued on next page.)

Primary Examiner—William Neuder
Attorney, Agent, or Firm—Watov & Kipnes, P.C.

[57] ABSTRACT

A method for enhancing gas or oil production by delivering a nitrogen rich gas produced from a non-cryogenic source into the well and/or reservoir where the gas and/or oil is located.

13 Claims, 9 Drawing Sheets

OTHER PUBLICATIONS

Anthony J. Welker; *The Oil & Gas Book*; Chapter 7; "Casing and Primary Cementing"; pp. 79–99, 120 and 121; Sci. Data Pub. (1985).

Jacques Hagoort et al.; J. of Pet. Tech. (Apr. 1988); pp. 463–469.

Introduction to Artificial Lift and Gas Lift; pp. 1–10.

"Nitrogen Takes Hold for Advanced Recovery"; published by Niject Services Company (5 pages).

Earl R. Beaver et al., *Energy*Progress, vol. 6, No. 3, pp. 149–154 (Sep. 1986).

Thomas L. Hardenburger et al., "Optimization Of On–Site Non–Cryogenic Nitrogen Systems Relative Nitrogen Use Patterns" 1992 AICHE Meeting (8 pages).

Letter to D. Richardson dated Jul. 21, 1989 with attachment (total 10 pages).

NOWSCO Eng. Tech update EUO0006 (3 pages).

NOWSCO Well Services Ltd "Under–Balance Drilling Options" (8 pages).

Feasibility Study EKO Fisk Nitrogen Production Vessel (Nov. 1985) (7 pages).

Stewart & Stevenson Annual Report 19912, pp. 16–17.

CADE/CAODC Spring Drilling Conference, Bruce Thistle et al., "Horizontal Drilling of a Low Pressure Fracture Shale Reservoir With Crude Oil and Nitrogen", pp. 1–18 (Apr. 14–16, 1993).

PanCanadian tries coiled–tubing completion. *Improved Recovery Week*, vol. 2, No. 7, p. 1 (2), (Feb. 22, 1993).

John Gunn "Damage Control: Underbalanced Drilling is moving to the top of the Toolbox" *Oilweek*, vol. 45, No. 12, p. 20(1), (Mar. 21, 1994).

Permia, Inc. PRISM Alpha Membrane Separators (8 pages) (1987).

"High Tech Nitrogen Pumper is Developed" *Am Oil and Gas Reporter*, Jul. 1991, pp. 58 and 59.

T. Johannessen "Presentation of a 6000 $Nm^3/h$ Nitrogen System based on Membrane Separation of Air" Swiss. Chem., vol. 9, No. 6A (1987) (6 pages).

Zwick Energy Research "Nitrogen Generating Systems" (2 pages).

PERMEA Marine Protection Regarding PRISM Nitrogen Systems (4 pages).

P.D. Alan "Nitrogen Drilling System for Gas Drilling Applications" SPE $69^{th}$ Annual Technical Conference (Sept. 25–28, 1994).

NON-CRYOGENIC NITROGEN FOR ON-SITE DOWNHOLE DRILLING AND POST DRILLING OPERATIONS

RELATED APPLICATIONS

This is a Continuation Application of U.S. Ser. No. 08/944,919 filed on Oct. 6, 1997, now U.S. Pat. No. 5,862,869, which is a Continuation Application of U.S. Ser. No. 08/707,352 filed on Sep. 4, 1996 which issued as U.S. Pat. No. 5,749,422 on May 12, 1998 which is a Continuation-In-Part Application of U.S. Ser. No. 08/077,014 filed on Jun. 14, 1993 which issued as U.S. Pat. No. 5,388,650 on Feb. 14, 1995.

This application is a continuation-in-part application of U.S. Ser. No. 08/077,014 filed Jun. 14, 1993 which will issue U.S. Pat. No. 5,388,650 on Feb. 14, 1995.

FIELD OF THE INVENTION

The present invention is directed to methods of drilling for oil, gas or geothermal wells and the like as well as post-drilling operations which employ an inert gas in the downhole region or in the reservoir. The inert gas, typically a nitrogen rich gas, is supplied on-site by the preferential separation of air using a non-cryogenic source of the inert gas such as a membrane or a pressure swing adsorption system.

BACKGROUND OF THE INVENTION

U.S. patent application Ser. No. 08/077,014 filed on Jun. 14, 1993, incorporated herein by reference discloses a method for injecting a non-cryogenic inert gas such as nitrogen gas in the downhole region during drilling operations, to remove drill cuttings. This method presents advantages over downhole drilling using combustible gases such as air and cryogenic fluids such as liquid nitrogen.

Drilling and post-drilling operations efficiently establish a well, cement or secure casings or other tubular members within the well and remove the desirable payloads (e.g. gas and/or oil) from the well or directly from the reservoir containing the same. Methods of performing these operations are well-known.

Generally, the drilled wells are provided with tubular casings which secure the perimeter of the wellbore. Sometimes multiple casings (intermediates) are secured from the surface of the well to lower downhole locations. Other types of casings, called liners, are sometimes used to extend from the lowermost casing into the lowermost portion of the wellbore. Drilling fluids, such as drilling mud, are often used when large flows of water are present in the well. The drilling mud is circulated down the drill string, through the drill bit, and up the annular region between the drill string and the wellbore or casing to the surface. Gas may be injected in the downhole region to provide faster drilling rates when substantial amounts of water are not present in the well.

Air has been used as the principal downhole drilling fluid for low water content drilling. The air can be combined with a surfactant, foaming agent, water and/or mud for different applications. The primary advantages of straight air drilling are greatly increased penetration rates, greater bit footage and fewer downhole drilling problems.

Downhole drilling with air, however, does have a number of disadvantages, one of the most important of which is the occurrence of downhole explosions or fire due to the presence of high levels of oxygen in air. Efforts have been made to reduce the hazards of air drilling by lowering the temperature of the air or by replacing air with an inert gas. U.S. Ser. No. 08/077,014 discusses prior art efforts to solve the problem and discloses the advantages of using non-cryogenic inert gases (e.g. nitrogen) for this purpose.

There are other significant problems encountered in drilling and post-drilling operations. When a drilling fluid (e.g. drilling mud including optional chemicals and additives) is introduced into the downhole region, the weight of the drilling fluid creates a hydrostatic pressure proportional to the density of the fluid. The deeper the well, the greater the hydrostatic head pressure developed by the column of the drilling fluid.

The weight of the drilling fluid can be adjusted at the surface by changing the mud weight, or changing to a more or less dense drilling fluid. The drilling fluid can be lightened by co-mingling the drilling fluid with a lower density fluid such as a gas. Nitrogen gas is advantageous for this purpose because it is inert and non-corrosive.

In drilling operations, the formation pressure of the reservoir (i.e. the pressure exerted by the gas and/or oil) will vary throughout the downhole region. When the formation pressure is equal to the hydrostatic pressure of the drilling fluid, the fluid system is said to be balanced. If the formation pressure is less than the hydrostatic pressure of the drilling fluid, the system is overbalanced. Greater formation pressure than hydrostatic pressure results in an underbalanced system.

By maintaining an underbalanced system (i.e. the formation pressure exceeds the hydrostatic pressure of the drilling fluid), the formation pressure causes a net flow of the gas and/or oil into the wellbore. The density of the drilling mud must often be reduced to generate an underbalanced drilling condition. Air has been used to reduce the density of the drilling mud. However, under some circumstances, the presence of combustible air in the downhole region can create explosive conditions.

Another problem associated with downhole drilling relates to the installation of the casings and liners. Quite often the casings rub against the sides of the wellbore which makes installation difficult and can cause damage to the casing and/or the wellbore or formation of interest. The drill string, as well as subsequent casings or liners, are often filled with a drilling fluid and can become stuck in the downhole region, particularly when at least a portion of the downhole region of the well extends horizontally. In addition, the cementing of the casings within the downhole region is difficult because the cement has limited flexibility with regard to flow properties and weight distribution.

Post drilling operations also suffer from a number of difficulties. The removal of gas and/or oil from the downhole region presents several problems to drillers. First, gas and/or oil removal is inhibited by the presence of water and debris in the well. Second, the withdrawal of the gas and/or oil from deep wells requires high pressure equipment to displace the heavy well fluids from the well. Third, the permeability of the downhole region of the well often decreases over time thereby decreasing the rate at which gas and/or oil enter the production string from the reservoir. Fourth, gas and/or oil production depend on the pressure on the fluids within the reservoir. As the pressure decreases (depletes), production will decrease. Quite often production will cease from the lack of formation pressure even when significant amounts of gas and/or oil remain in the reservoir.

It would be a significant advance in the art of drilling for gas, oil and geothermal wells if the drilling and post drilling operations could be improved and particularly if an inert gas, typically a nitrogen rich gas, could be conveniently and efficiently supplied to the downhole region of the well and/or reservoir to eliminate or at least reduce the aforementioned problems.

SUMMARY OF THE INVENTION

The present invention is generally directed to a method of drilling for gas and/or oil or a geothermal well and the like in which a compressed inert gas is delivered to a target such as a well, and/or a reservoir containing oil and/or gas. The inert gas is obtained from an on-site non-cryogenic source. In particular, the source of the inert gas is air which is preferentially separated into an inert gas rich fraction and an oxygen waste gas fraction such as by membrane separation or by pressure swing adsorption or the like.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to the on-site non-cryogenic production of an inert gas, typically a nitrogen rich gas and its delivery to a well and/or reservoir for the drilling of gas and/or oil or geothermal wells and the like. As used herein the term "nitrogen rich gas" shall refer to a gas containing predominantly nitrogen gas and no more than 10% oxygen gas by volume. The nitrogen rich gas is produced from air by a number of different methods including membrane separation, pressure swing adsorption, vacuum swing adsorption, fuel cells and the like.

Figure 1:
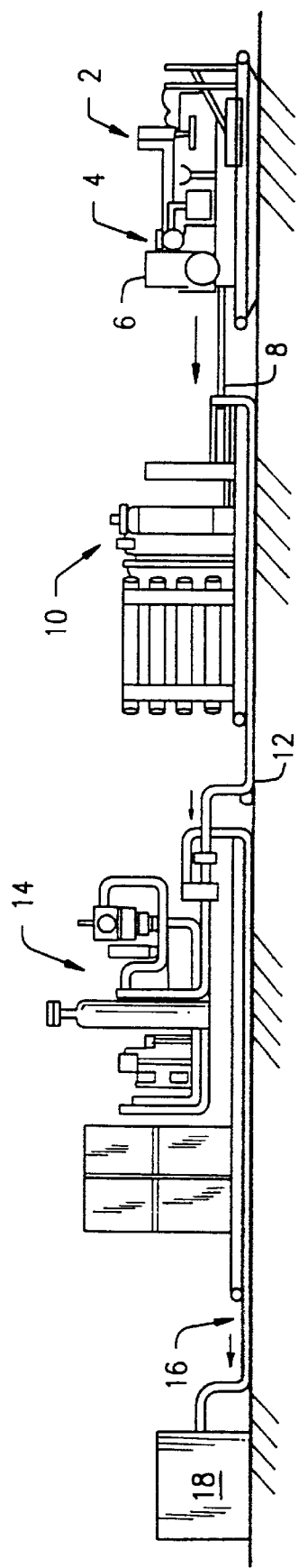
FIG. 1 is a schematic view of an embodiment of the invention showing an above surface apparatus for generating a nitrogen rich gas from an air-separation membrane to be delivered to the well and/or reservoir.

Referring to FIG. 1 there is shown an above ground installation for producing a nitrogen rich gas using membrane separation and for delivery of the nitrogen rich gas to the well and/or reservoir. A feed air compressor 2 includes an intake port 4 for receiving ambient air and a compressor 6 for pressurizing the air to a suitable pressure, typically in the range from about 100 to 350 psig.

The compressed air is sent through a conduit 8 to an air separation membrane system shown generally by numeral 10, such as a high performance air separation membrane system manufactured by Generon Systems, Inc. of Houston, Tex.

The membrane is composed of bundles of hollow fiber, semi-permeable membranes which are assembled parallel to a central core tube. The bundle is placed into an outer case to form an air separation module. The air is divided into two streams; a nitrogen rich stream and a stream rich in oxygen and water vapor.

When the compressed air is introduced to the feed side of the membrane fibers, the air travels down the bore of the hollow permeable fibers. Oxygen, water vapor and other "fast gases" pass through to the outside of the fibers. The oxygen-rich gas stream then flows through the fiber bundle to the periphery of the outer case of the separator system where it is discharged as a by-product.

While all but a small fraction of the oxygen passes through the membrane material to the exterior of the hollow fibers, most of the nitrogen present in the feed air is contained within the hollow fiber membrane. As a result, the nitrogen rich gas is effectively separated from the feed air and exits the membrane system 10 via a conduit 12 for entry into an optional booster compressor 14.

The booster compressor 14 is employed to elevate the pressure of the nitrogen rich gas. The pressure of the gas obtained from the air separation membrane system 10 is from about 100 to 200 psig. The booster compressor 14 is capable of raising the pressure of the nitrogen rich gas from as low as 200 psig up to or exceeding 4500 psig and even as high as about 10,000 psig, but typically in the range of from about 1,000 to 2,000 psig. The highly compressed nitrogen rich gas leaves the booster compressor 14 via a conduit 16 and is sent to a surface equipment installation 18 of the drilling operation as explained in detail hereinafter.

Figure 2:
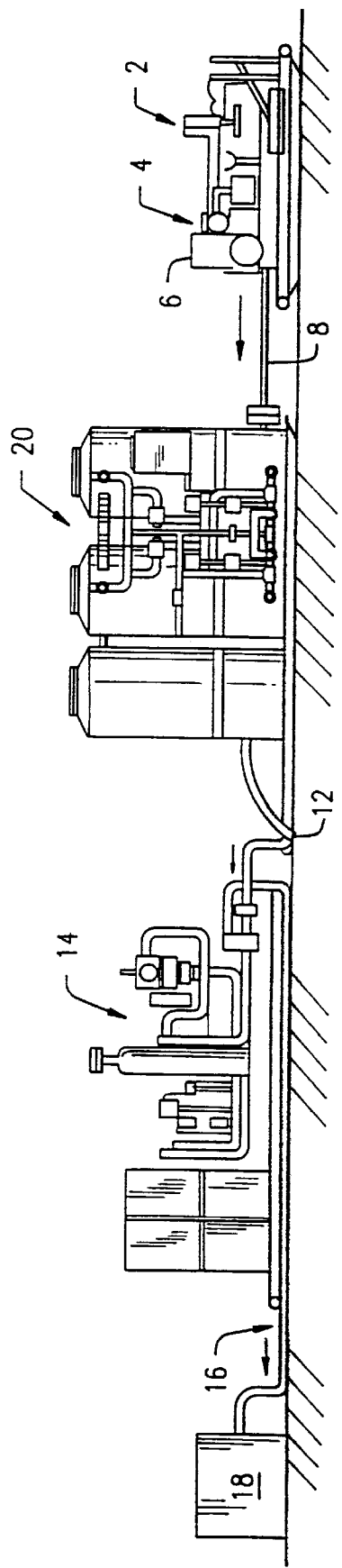
FIG. 2 is a schematic view similar to FIG. 1 in which a nitrogen rich gas is generated by a pressure swing adsorption unit.
Figure 3:
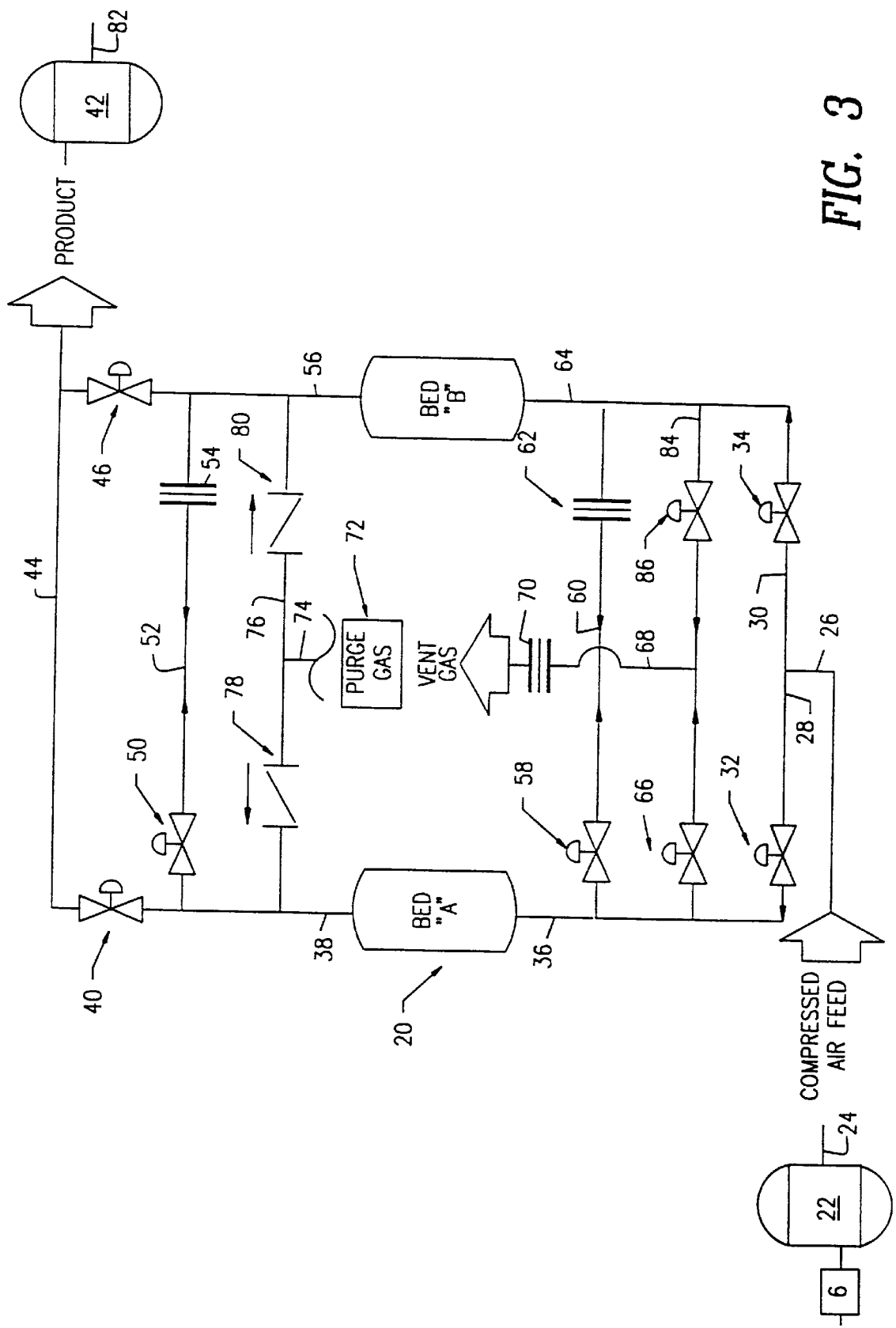
FIG. 3 is a schematic view of a two bed pressure swing adsorption system for generating a nitrogen rich gas.

The nitrogen rich gas may also be produced by a pressure swing adsorption system in accordance with the present invention. Referring to FIGS. 2 and 3, there is disclosed a pressure swing adsorption unit 20 having two beds "A" and "B". It should be understood, however, that the present invention is applicable to pressure swing adsorption units having an alternate construction such as a greater number of beds.

Referring to FIG. 3, air from a source (not shown) is fed to a compressor 6 to raise the pressure of the air, to accumulate compressed air during the non-production phase and to output compressed air during peak loading of the beds. The compressed air is fed to a storage vessel 22. The compressed air is then fed via the conduit 24, 26 to an outlet 28 leading to bed A and an outlet 30, leading to bed B. Each outlet 28, 30 is controlled by respective valves 32, 34. When valve 32 is opened, allowing the compressed air to reach bed A, valve 34 remains closed so that bed B may undergo regeneration during the depressurization phase of the pressure swing adsorption unit 20.

The compressed air enters the bed A through the open valve 32 via a conduit 36. The bed A contains at least one adsorption material capable of preferentially adsorbing oxygen and other waste gases. The preferred adsorbents are selected from molecular sieves and silica gel. As a result, substantially pure nitrogen passes out of the bed A through a conduit 38, a valve 40 and into a nitrogen storage vessel 42 via a product line 44 for passage via a conduit 82 to the optional booster compressor 14 shown in FIGS. 1 and 2.

While bed A is producing nitrogen gas, bed B is at atmospheric pressure. Upon completion of the nitrogen production cycle in bed A, the system undergoes equalization to raise the pressure in bed B to an intermediate pressure. This is accomplished by closing the nitrogen product valves 40, 46 and the compressed air intake valves 32, 34. Thus, the input of compressed air and the output of nitrogen product are temporarily suspended.

Equalization is accomplished by passing a portion of the pressurized gas from the top of the bed A via a conduit 38, valve 50, a conduit 52, restrictive orifice 54, through a conduit 56 and into the top of the bed B. In addition, pressurized gas is passed from the bottom of the bed A via the conduit 36, a valve 58, a conduit 60, a restrictive orifice 62 and a conduit 64 into the bottom of bed B.

Once equalization is completed so that bed A and B are at similar pressures, bed A undergoes regeneration by depressurizing to atmospheric pressure to remove the oxygen enriched waste gases. This is accomplished by closing the equalization valves 50, 58 and opening a regeneration valve 66 for the bed A. The waste gas is then vented to the atmosphere through a conduit 68 and a restrictive orifice 70. As a consequence, the bed A is regenerated.

Further cleansing of the bed A may be made by passing a purge gas, such as substantially pure nitrogen gas, from a source 72, through conduits 74 and 76, respectively, a valve 78 and into bed A via the line 38. When the bed B is further cleansed, the purge gas passes through the conduits 74 and 76, respectively, a valve 80 and the conduit 56. After purging, the adsorbents are ready for adsorbing waste gases in a new nitrogen production cycle.

Since the pressure in bed B has been raised to an intermediate pressure, it is ready to receive compressed air. The compressed air is provided through the valve 34 and the conduit 64. It may be necessary, in order to get sufficient compressed air to quickly load bed B up to operating pressure, for the compressed air feed generated by the compressor 6 to be supplemented by compressed air already stored in the storage vessel 22.

Once bed B has been loaded, the valve 46 is opened, allowing product gas to enter the product line 44 via the conduit 56 from which it enters the storage vessel 42. A distribution conduit 82 extends from the storage vessel 42 to provide a flow of nitrogen rich product gas to the booster compressor 14 shown in FIGS. 1 and 2.

After nitrogen production in bed B is completed, the valve 46 is closed as is the valve 34 to stop the compressed air feed. The equalization circuit is activated by opening valves 50, 58 and the pressurized gas is fed from the top and bottom of bed B to bed A to raise the pressure therein to an intermediate pressure level. Bed B is then depressurized by eliminating the oxygen rich waste gases which are sent via the conduits 64, 84 through a valve 86 to the atmosphere via the conduit 68 and restrictive orifice 70.

Thereafter, compressed air from the compressor 6 and the storage vessel 22 is fed to bed A through the valve 32 via the conduit 36 to raise bed A to the desired operating pressure thereby commencing the nitrogen production cycle from bed A which passes into the booster compressor 14.

Figure 4:
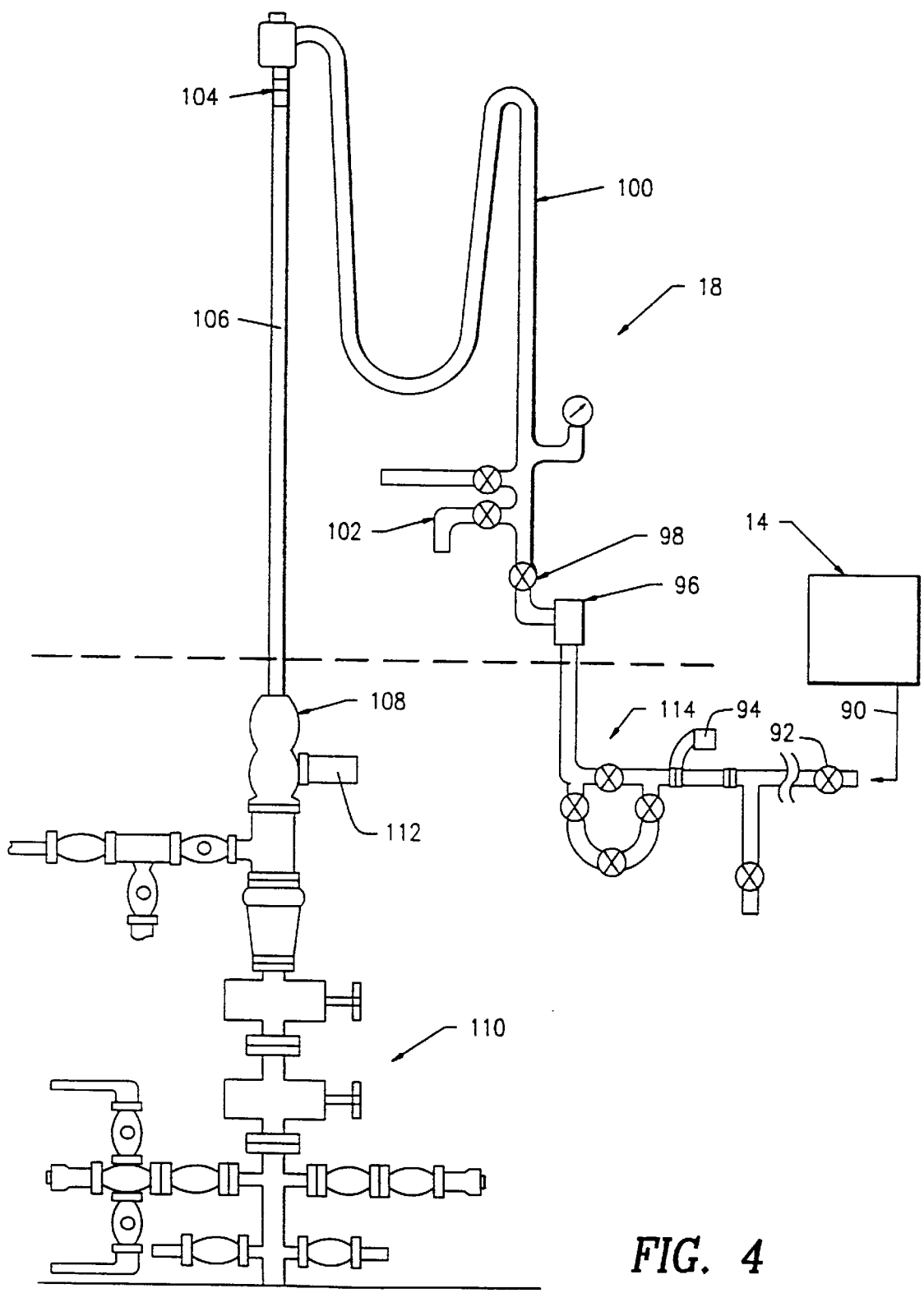
FIG. 4 is a schematic view of a surface equipment installation for delivering the inert gas to the well and/or reservoir.

The nitrogen rich gas, after compression up to as high as 10,000 psig in the booster compressor 14, is sent to surface equipment installation shown in FIG. 4.

Referring to FIG. 4, the high pressure nitrogen rich gas obtained from the booster compressor 14 is sent to the surface equipment 18 via a conduit 90 through a main block valve 92. The flow rate of the nitrogen rich gas is typically measured by an orifice meter 94. The metered nitrogen rich gas is sent through an adjustable choke 96 and a pressure shut off valve 98 before entering a standpipe 100. In accordance with the present invention and as explained hereinafter, the nitrogen rich gas can be added to the drilling fluid (e.g. drilling mud) to lower the density thereof in the standpipe 100 through a conduit 102.

For drilling purposes, the nitrogen rich gas is fed through a Kelly cock or swivel 104, through a Kelly string 106 and into a Kelly packer 108. The Kelly string is a square or hexagonally shaped pipe which can readily be rotated if necessary in the rotating Kelly packer 108. This causes the entire drill stem assembly 124 and the drill bit 138 (see FIG. 5) to rotate during drilling operations. If the well to be drilled is deviated or horizontal, an air motor (not shown) is used to provide rotary motion in the drilling bit rather than rotating the entire drill string as is customary in the art.

The nitrogen rich gas continues to flow until it reaches a drill stem assembly 124 (see FIG. 5) which is typically connected in lengths called pipe stands. The drill stem assembly 124 is fed through the well head assembly (shown generally by numeral 110) which may contain a series of pipe rams, vents and choke lines. As will be explained hereinafter, there is provided an outlet 112 which is connected to a blooey line for discharging the exhaust nitrogen gas and drill cuttings.

For non-drilling applications, the drill stem assembly may be removed and the nitrogen rich gas can be pumped into the downhole region through the pathway 128.

The surface installation may optionally include an injector manifold 114 for injecting chemicals, such as surfactants and special foaming agents, into the nitrogen rich gas feed stream to help dissolve mud rings formed during drilling or to provide a low density, low velocity circulation medium of stiff and stable foam chemicals to cause minimum disturbance to unstable or unconsolidated formations.

Extending below the surface of the ground into the downhole region is a drill stem arrangement which provides a pathway for the flow of pressurized nitrogen rich gas to the drilling region. There is also provided a second pathway for the flow of nitrogen gas and the drill cuttings out of the downhole region and away from the drilling operation.

Figure 5:
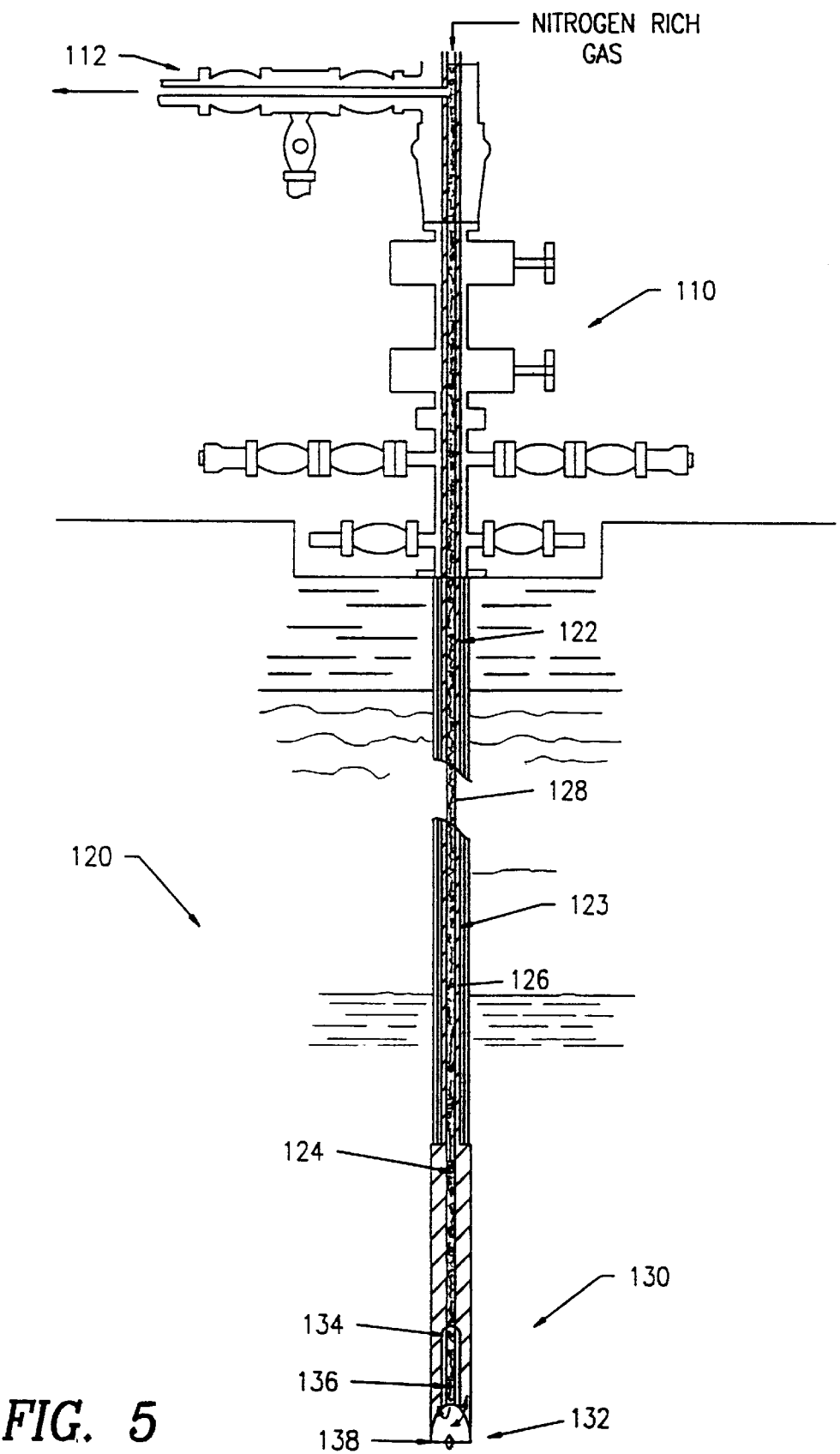
FIG. 5 is a schematic view of a drill stem arrangement showing the delivery of the inert gas to the downhole drilling region.

Referring to FIG. 5, the drill stem arrangement shown generally by numeral 120 includes a surface pipe 122 and casing 123 and the drill stem assembly 124 running concentrically with and spaced apart from the surface pipe 122 and production casing 123 to define a pathway 126 for the return nitrogen rich gas and the drill cuttings. The center of the drill stem assembly 124 provides a pathway 128 for the flow of nitrogen rich gas to the drilling region. At the end 130 of the drill stem arrangement 120, in vicinity of the drilling region 132, is a conventional tool joint 134, a drill collar 136 and a drill bit 138.

The nitrogen rich gas produced by the air separation membrane system 10 or the pressure swing adsorption system 20 or other non-cryogenic system typically has a nitrogen content of at least about 85% by volume, preferably at least about 95% by volume, and an oxygen content of no more than 10% by volume, preferably less than about 5% by volume. The nitrogen rich gas is sent to a booster compressor 14 where the pressure is raised from as low as 200 psig to as high as 10,000 psig or more, typically in the range of about 1,000 to 2,000 psig. The pressurized nitrogen rich gas is sent to the surface installation equipment 18 where it is monitored and metered into the downhole through the pathway 128 within the drill stem assembly 124.

Because the nitrogen rich gas is under pressure, it swirls around the drilling region 132 with sufficient force and velocity to carry the drill cuttings upwards into the pathway 126. The drill cutting containing stream then exits the outlet 112 of the surface installation equipment 18 where it is carried to a blooey line and eventually discarded into a collection facility, typically at a location remote from the actual drilling site.

The nitrogen rich gas described above for removing drilling cuttings can also be injected into the drilling fluid to reduce the density thereof. This provides greater control over the drilling fluid and is particularly adapted for underbalanced drilling where the pressure of the drilling fluid is reduced to a level below the formation pressure exerted by the oil and/or gas formation. The nitrogen rich gas can be provided to the drilling fluid in the following manner.

Referring to FIG. 5, the nitrogen rich gas can be injected into a drilling fluid through an assembly shown in FIG. 5 absent the drill stem assembly 124. In this embodiment of the invention, the nitrogen rich gas is pumped through the pathway 128 which may be in the form of linear pipe strings or continuous coiled tubing known as a drill string. Alternatively, the nitrogen rich gas may be pumped into the annular space 126 between the drill string or pathway 128 and the casing 123 inserted into the well. In this embodiment a drill string may be inserted directly into the annular space 123 to provide the nitrogen rich gas directly therein.

The nitrogen rich gas produced in accordance with the present invention can be used to modify the flow properties and weight distribution of the cement used to secure the casings within the well.

Figure 6:
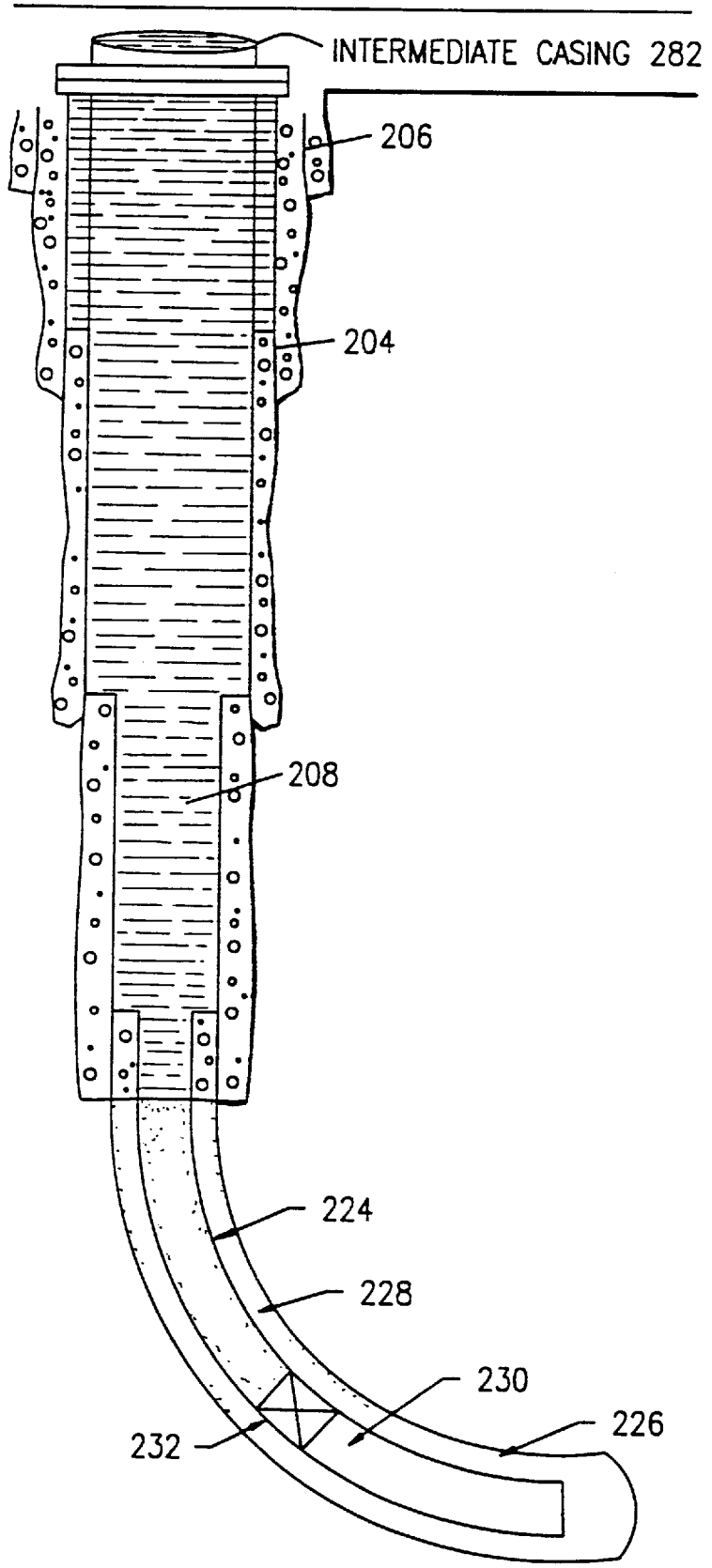
FIG. 6 is a cross-sectional schematic view of a well with a horizontally disposed section including appropriate casings and upper and lower liners with a nitrogen rich gas present therein.
Figure 7A:
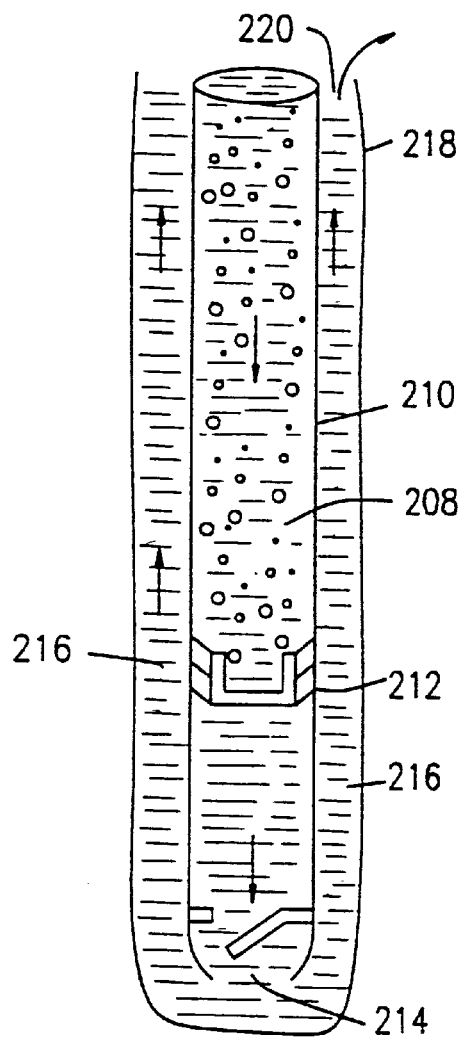
FIG. 7A is a cross-sectional schematic view showing the initial injection of a cement slurry for cementing a casing within the well.
Figure 7B:
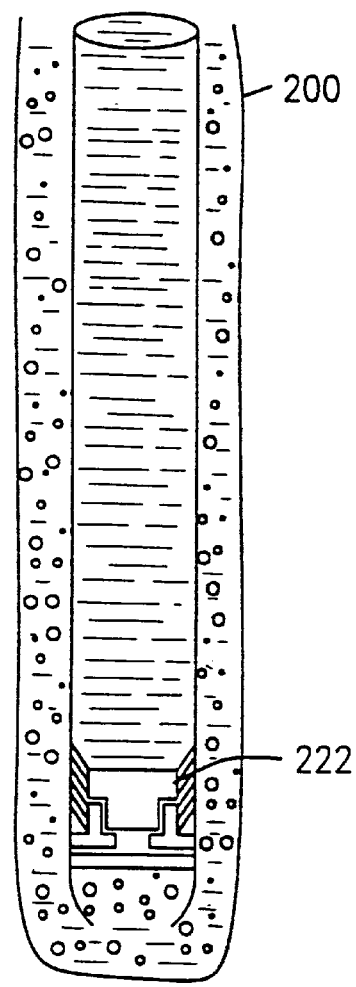
FIG. 7B is a cross-sectional schematic view of the casing shown in FIG. 7A with the cement in place to secure the casing within the well.

Referring to FIGS. 6, 7A and 7B and first to FIG. 6, there is shown the well 200 supported by tubular casings including an intermediate casing 202, a surface casing 204, and a conductor casing 206.

The conductor casing 206 is set at the surface to isolate soft topsoil from the drill bit since drilling mud will erode the top section of the wellbore.

The surface casing 204 also extends from the surface of the well and is run deep enough to prevent any freshwater resources from entering the wellbore. In addition to protecting the fresh water, the surface casing 204 prevents the wellbore from caving in and is an initial attachment for the blow-out-prevention (BOP) equipment. Typical lengths of the surface casing 204 are in the range of from about 200 to 2500 ft.

The intermediate casing 202 protects the hole from formations which may prove troublesome before the target formation is encountered. It is as named because it is intermediate in length; longer than the surface casing, but shorter than the final string of casing (production casing) 123 as shown in FIG. 4.

The production casing (oil string or long string) extends from the bottom of the hole back to the surface. It isolates the prospective formation from all other formations and provides a permanent conduit through which reserves can be recovered.

The diameter of the various casings decreases as the depth of the casing into the well 200 increases. Accordingly, the intermediate casing 202 extends the furthest into the well 200. The intermediate casing is typically filled with a drilling fluid 208 such as drilling mud.

The process of securing the casing within the well using a cement-like material is shown with reference to FIGS. 7A and 7B. Referring first to FIG. 7A, there is shown a well 200 containing a casing 210 which is initially filled with a drilling fluid 208 such as drilling mud or a drilling mud modified with a nitrogen rich gas in accordance with the present invention. A wiper plug 212 is inserted into the casing 210 and urged downward to force the drilling fluid out of the bottom opening 214 and up along the annular space 216 between the walls 218 defining the wellbore and the casing 210. The drilling fluid proceeds upwardly through the annular space 216 and out of the opening 220 at the top of the well 200.

While the drilling fluid is being evacuated a cement-like material in the form of a slurry is loaded into the casing 210. A second wiper plug 222 is then urged downwardly as shown in FIG. 7B to force the cement out of the bottom opening 214 until the annular space 216 is filled. Excess cement escapes out of the opening 220 of the well.

In accordance with the present invention, a nitrogen rich gas produced as described above may be used to reduce the density of the cement in a manner similar to that described for the drilling fluid. The nitrogen rich gas may be injected into the casing while the cement is being added therein. The injection of the nitrogen rich gas into the cement modifies the density and flow characteristics of the cement while the cement is being positioned in the well.

The nitrogen rich gas is injected into the casing through a drill string of the type described in connection with FIG. 5 with the drill stem assembly 124 removed. The rate of injection and the precise composition of the nitrogen rich gas is controlled above the surface by the feed rate of air to the membrane separation unit or pressure swing absorption unit shown in FIGS. 1–3.

The nitrogen rich gas can be used to improve the buoyancy of the casings so as to minimize the effects of friction as the casings are inserted into the well. This is particularly apparent when casings are inserted into horizontal sections in the downhole region. In horizontal sections, the weight of the casing causes it to drag along the bottom surface of the wellbore. In extreme cases the casing may become wedged in the wellbore and not be able to be advanced as far into the downhole region as desirable. Introducing a nitrogen rich gas in accordance with the present invention into the interior of the casing will increase the buoyancy of the casing, allowing it to float in the mud or drilling fluid surrounding the casing.

Referring again to FIG. 6, there is shown a casing assembly including a tubular member or liner 224 which is designed to enter a horizontal section 226 of the well 200. A liner is any length of casing that does not extend to the surface of the well.

The liner 224 includes an upper section 228 which contains a drilling fluid and a lower section 230. The upper and lower sections are separated by an inflatable packer 232. The lower section 230 is charged with the nitrogen rich gas which makes it lighter and more buoyant than the upper section 228 which is filled with mud. The lower section 230 may therefore move more readily into the horizontal section 226 of the well 200.

After the completion of drilling in the downhole region, nitrogen rich gas can be used to improve well performance and maximize output of gas and/or oil from the reservoir.

Quite often well production declines because of the presence of fluids, such as water, excess drilling mud and the like in the downhole region. The nitrogen rich gas produced in accordance with the present invention can be used to clean out the well by displacing the heavier fluids that collect therein. Removal of the heavier fluids will regenerate the flow of gas and/or oil from the reservoir if there is sufficient formation pressure within the reservoir. The nitrogen rich gas can be used to provide an additional boost for lifting the gas and/or oil from the downhole region to a collection area. In this case the nitrogen rich gas is pumped down into the downhole region within the casing under sufficient pressure so that the gas and/or oil entering the downhole region from the reservoir is lifted upwardly and out of the well.

Figure 8:
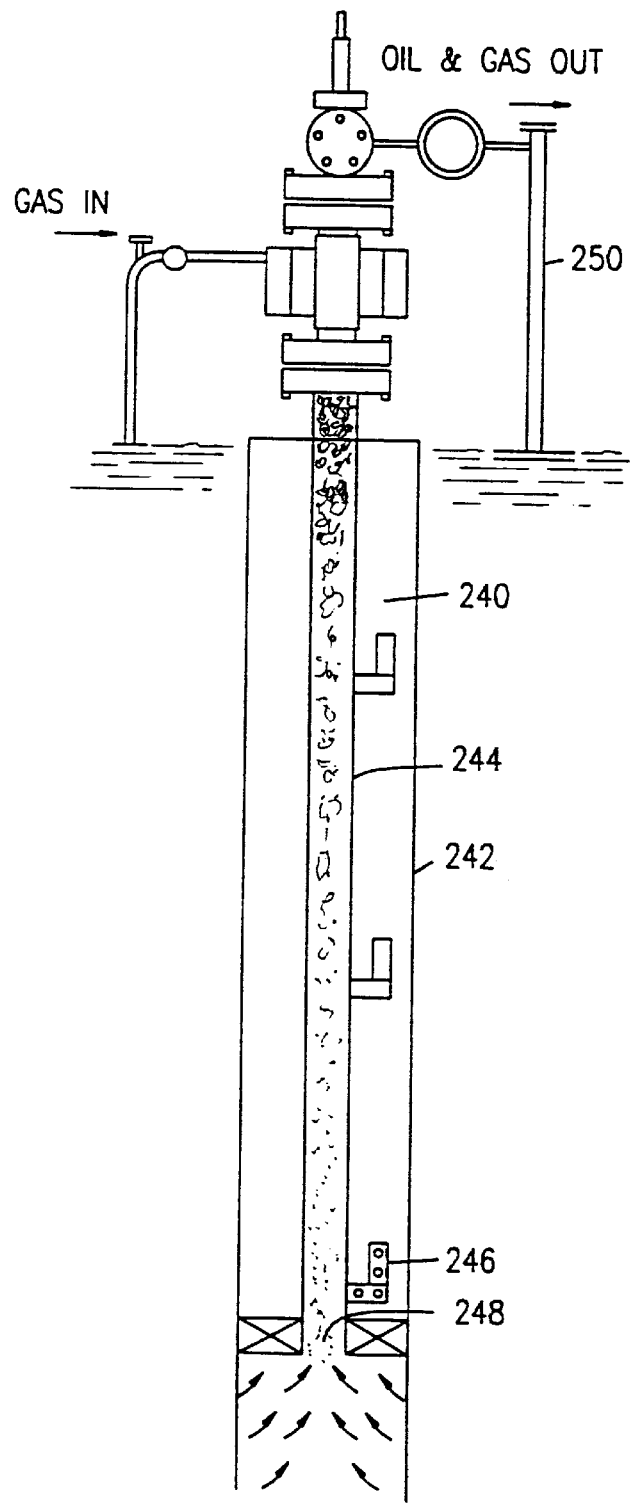
FIG. 8 is a cross-sectional schematic view of a well and equipment for removing gas and/or oil from the well with the assistance of a nitrogen rich gas.

Referring to FIG. 8, there is shown an assembly particularly suited for injecting a nitrogen rich gas into the gas and/or oil within the downhole region to facilitate delivery thereof upwardly through the well for collection. Such a system is applicable to downholes having reduced formation pressure. As a result the gas and/or oil has difficulty entering the downhole from the reservoir.

In accordance with the present invention, the nitrogen rich gas is injected into the annulus 240 between the casing 242 and a tubing 244. The nitrogen rich gas is metered into the tubing 244 through a valve assembly 246. The tubing 244 has an opening 248 enabling gas and/or oil from the downhole region to enter and rise up to the surface of the well. The injection of the nitrogen rich gas from the valve assembly 246 into the tubing 244 assists the gas and/or oil by providing buoyancy to the flow upwardly to the above ground collection area 250. This process is commonly referred to as artificial gas lift.

In another application for nitrogen rich gas in accordance with the present invention, the gas is used to stimulate the well in the downhole region to enhance gas and/or recovery. More specifically, the walls of the wellbore in the downhole region characteristically have cracks or fissures through which the gas and/or oil emerges from the reservoir. As the pressure in the reservoir decreases, the fissures begin to close thereby lowering production. The most common form of stimulating the downhole region is by acidizing or fracturing the wellbore. The nitrogen rich gas produced in accordance with the present invention can be used as a carrier for the acid to treat the wellbore. The nitrogen rich gas expands the volume of the acid, retards the reaction rate of the acid resulting in deeper penetration and permits faster cleanup because there is less liquid to be displaced by the high energy nitrogen rich gas.

Cracking of the wellbore in the downhole region can be performed by pumping a fluid such as acid, oil, water or foam into a formation at a rate that is faster than the existing pore structure will accept. At sufficiently high pressures, the formation will fracture, increasing the permeability of the downhole. When the stimulation procedure is completed, the pressure in the formation will dissipate and the fracture will eventually close. Sand and/or glass beads or other so-called "poppants" may be injected into the formation and embedded in the fractures to keep the fractures open. The nitrogen rich gas produced in accordance with the present invention may be used as a carrier gas to carry the poppants to the wellbore.

It is well established that the pressure in a reservoir (formation pressure) provides for the flow of gas and/or oil to the downhole region. As the reserves of gas and/or oil become depleted, the formation pressure decreases and the flow gradually decreases toward the well. Eventually the flow will decrease to a point where even well stimulation techniques as previously described will be insufficient to maintain an acceptable productivity of the well. Despite the reduced formation pressure, nonetheless, the reservoir may still contain significant amounts of gas and/or oil reserves.

In addition, gas-condensate reservoirs contain gas reserves which tend to condense as a liquid when the formation pressure decreases below acceptable levels. The condensed gas is very difficult to recover.

Figure 9:
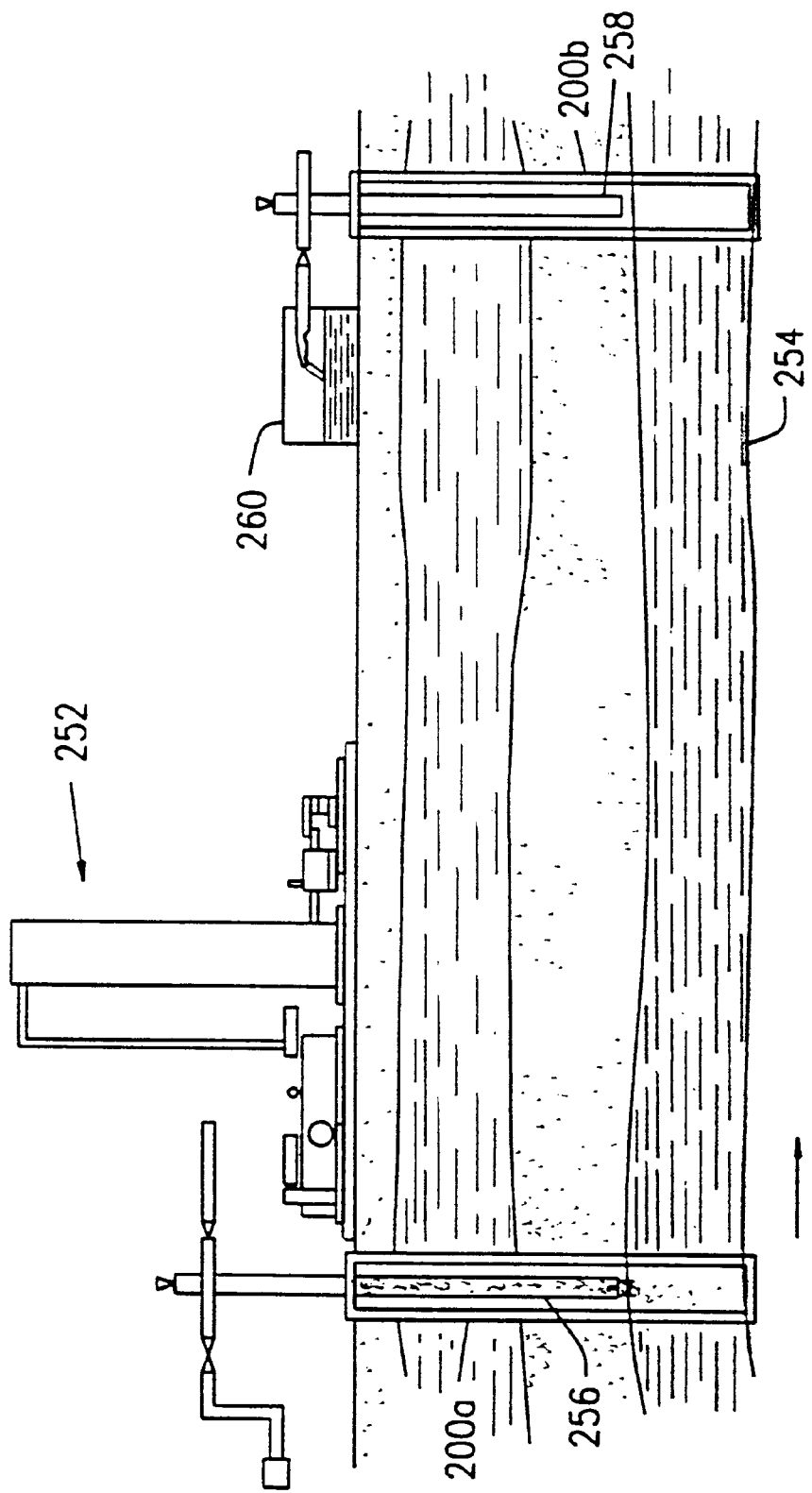
FIG. 9 is a cross-sectional schematic view of a reservoir and the injection of a nitrogen rich gas to remove gas and/or oil from the reservoir.

The lack of formation pressure in a reservoir can be remedied by injecting a nitrogen rich gas directly into the reservoir. Referring to FIG. 9, a nitrogen rich gas production assembly of the type shown in FIGS. 1 and 2 is shown generally by numeral 252. The assembly is constructed above a gas and/or oil reservoir 254. Nitrogen rich gas is pumped down the well, often called an injector well 200a, through a tubing 256 to exert pressure on the reserves in the direction of the arrow. The increased pressure on the gas and/or oil causes the same to flow to a producing formation and up a producing well 200b through a tubing 258 into an above ground collection vessel 260.

The production of a nitrogen rich gas in accordance with the present invention and its delivery to a well and/or a reservoir is less costly and more reliable than conventional systems using cryogenic nitrogen and the like, and safer than using air or any gas containing appreciable amounts of oxygen.

EXAMPLE 1

The flow rate of nitrogen rich gas to the drilling region of an oil and/or gas well or a geothermal well can vary over a wide range depending on the size of the downhole, the depth of the well, the rate of drilling, the size of the drilling pipe, and the makeup of the geologic formation through which the well must be drilled.

A typical drilling operation will require the production of from 1,500 to 3,000 standard cubic feet per minute (scfm) of nitrogen gas from an air separation system which can be anyone of a number of conventional systems including an air membrane separation system or a pressure swing adsorption system.

The purity of the nitrogen gas may vary, but is nominally set at no more than about 5% to 8% by volume of oxygen. The resulting nitrogen rich gas is then pressurized up to a pressure of from about 1,500 to 2,000 psig before being passed to the drilling region.

An average drilling operation will take about five days to two weeks, although difficult geologic formations may require several months of drilling. The nitrogen rich gas delivery system is designed for continuous operation and all of the nitrogen rich gas is generated on-site without the need for external nitrogen replenishment required for cryogenically produced liquid nitrogen delivery systems.

EXAMPLE 2

In a typical underbalanced drilling operation, 500 to 800 scfm (standard cubic feet per minute) of a nitrogen rich gas produced in accordance with the present invention is commingled with drilling mud to reduce the hydrostatic weight of the drilling fluid in the downhole region of a well. This reduces or prevents an overbalanced condition where drilling fluid enters the formation, or mud circulation is lost altogether. Carefully adjusting the weight of the drilling fluid will keep the formation underbalanced, resulting in a net inflow of gas and/or oil into the well.

EXAMPLE 3

If a drill string becomes stuck due to high differential pressure caused by combined hydrostatic and well pressure conditions, a nitrogen rich gas at 1500–3000 scfm at pressures of 1000–2000 psig is injected down the drill string to force the fluid up the annulus to the surface. The reduced weight and pressure will help free the stuck pipe. In this case, the nitrogen rich gas is used as a displacement gas.

EXAMPLE 4

A naturally producing reservoir loses pressure (depletes) over time with a resulting loss in recoverable oil and/or gas reserves. Injection of nitrogen at 1500 scfm or greater at various locations or injection sites will keep the reservoir pressurized to extend its production life. In gas condensate reservoirs, the pressure is kept high enough to prevent gas condensation or liquification, which is difficult to remove once liquified.

The nitrogen rich gas can be introduced into the producing wells by means of special valves in the production casing positioned in the downhole region of the well. The lifting action of the nitrogen rich gas is one form of artificial gas lift as shown best in FIG. 8.

What is claimed is:

1. Apparatus for enhancing gas or oil production from a target area selected from the group consisting of a well and a reservoir containing said gas or oil, said apparatus comprising:
   a) separation means for separating at least a substantial portion of oxygen contained within a feed stream of air at a site of said target area to produce a nitrogen rich gas and an oxygen enriched waste gas;
   b) delivery means for delivering the nitrogen rich gas obtained from the separation means to an injection means; and
   c) said injection means for injecting the nitrogen rich gas into the target area.

2. The apparatus of claim 1 wherein the separation means comprises an air separation membrane system.

3. The apparatus of claim 2 wherein the air separation membrane system comprises a plurality of bundles of hollow fiber, semi-permeable membranes and a central core tube.

4. The apparatus of claim 1 wherein the delivery means further comprises pressure increasing means for raising the pressure of the nitrogen rich gas obtained from the separation means.

5. The apparatus of claim 1 wherein the delivery means further comprises pressure control means for controlling the pressure of the nitrogen rich gas received from the separation means.

6. The apparatus of claim 1 wherein the delivery mean further comprises flow rate control means for controlling a flow of the nitrogen rich gas received from the separation means.

7. The apparatus of claim 1 wherein the delivery means further comprises means for combining the nitrogen rich gas with a drilling fluid to reduce the density thereof.

8. The apparatus of claim 1 wherein the injection means comprises a first pathway for the nitrogen rich gas from the delivery means to the target area to combine with drill cuttings and a second pathway for the flow of nitrogen rich gas and drill cuttings upwardly and out of the target area.

9. The apparatus of claim 1 wherein the injection means further comprises means for combining the nitrogen rich gas with a drilling fluid to reduce the density of the drilling fluid.

10. The apparatus of claim 1 wherein the injection means comprises a vessel secured within the target area by a cement like material and means for injecting the nitrogen rich gas into the cement like material to improve the flow properties of the cement like material.

11. The apparatus of claim 1 wherein the injection means comprises a vessel secured within the target area, and valve means for passing the nitrogen rich gas into the vessel.

12. The apparatus of claim 1 wherein the injection means further comprises means for delivering a flow of propant to the nitrogen rich gas to form a mixture and means for delivering the mixture to the target area to embed the propant within cracks or fissures in said target area.

13. The apparatus of claim 1 wherein the separation means comprises a pressure swing adsorption system.

* * * * *